United States Patent [19]

Hoffman

[11] 4,245,889
[45] Jan. 20, 1981

[54] HIGH BEAM WARNING APPARATUS

[76] Inventor: Robert O. Hoffman, P.O. Box 833, New Paltz, N.Y. 12561

[21] Appl. No.: 960,484

[22] Filed: Nov. 13, 1978

Related U.S. Application Data

[63] Continuation of Ser. No. 836,307, Sep. 26, 1977, abandoned.

[51] Int. Cl.³ ............................................. G02B 5/122
[52] U.S. Cl. ........................................ 350/102; 350/97
[58] Field of Search .......................... 350/102, 97-101, 350/102-105; D34/15 R; 48/32; 404/14-15; 40/302, 207; 204/19

[56] References Cited

U.S. PATENT DOCUMENTS

| 3,017,713 | 1/1962 | Butler ....................................... 350/97 |
| 3,802,378 | 4/1974 | Kessler ..................................... 350/97 |
| 3,980,393 | 9/1976 | Heasley et al. ........................ 350/97 |

FOREIGN PATENT DOCUMENTS 405471  1/1933  United Kingdom ...................... 350/97

Primary Examiner—John K. Corbin
Assistant Examiner—B. Wm. de los Reyes
Attorney, Agent, or Firm—Paul I. Edelson

[57] ABSTRACT

An apparatus for indicating to the operator of a following vehicle that his headlights are operating in the high beam mode is disclosed. A light reflective surface is provided for mounting on the rear of a vehicle and is positioned so that when a following or trailing vehicle is being operated with its headlights in high beam mode and the trailing vehicle is sufficiently close to the lead vehicle, a small portion of light from the high beams will be reflected backwardly, substantially in the direction of the course so as to provide a warning indication to the following vehicle that he is too close for high beam operation. During normal or low beam operation by the following vehicle, the position of the apparatus is such as to give little or no reflection.

12 Claims, 3 Drawing Figures

HIGH BEAM WARNING APPARATUS

This is a continuation of my copending U.S. application, Ser. No. 836,307, filed Sept. 26, 1977 now abandoned.

FIELD OF THE INVENTION

This invention relates to automobile signaling devices. More particulary this invention relates to a reflective device mounted on the rearward portion of an automobile to provide a warning signal to the operator of a following vehicle when he is operating his vehicle with the high beams of his head lamps energized at a range sufficiently close to be annoying to the operator of the vehicle ahead.

BACKGROUND OF THE INVENTION

While traveling on the highway at night it is ofter convenient to use one's high beam headlights for better road and terrain illumination. However, when a car with its high beams on approaches a car ahead of it, traveling in the same direction, these high beams often shine directly into the eyes of the driver of the lead car through reflection in his rear view mirror. This condition is hazardous and distracting to the lead driver. Often times the actions of the trailing vehicle driver are not at all deliberate. He has merely forgotten that he has his high beams on and/or that he is within range of a lead vehicle whose driver would be distracted by them. At present the only reminder that a driver would get indicating that his high beams are on, is the standard dashboard indicator in his own car. This is easily ignored or forgotten, and in addition it is on constantly when the high beams are on irrespective of whether or not he is sufficiently close to a lead vehicle to be distracting. While it is possible that the high beam driver will be reminded of his error by oncoming cars, this reminder is left to chance and since it usually consists of the oncoming driver flashing or holding his bright lights on, this too is distracting and hazardous to vehicles traveling along with, and in the vicinity of, the errant driver.

The invention disclosed herein seeks to ameliorate these problems by providing a non-distracting signal or reminder to the trailing driver with his high beams on, letting him know that he is driving too close to the lead car to have his high beams on.

BRIEF DESCRIPTION OF THE INVENTION

It is accordingly an object of this invention to provide a signaling apparatus to remind the driver of a trailing vehicle that he is driving with his headlights in high beam mode.

It is a further object of this invention to provide a signaling apparatus to remind the driver of a trailing vehicle that he is driving too close to the car in front with his headlights in high beam mode.

Briefly, and in accordance with one embodiment of this invention, a small reflective surface is mounted on a vehicle preferably at the rear thereof. The reflective surface is positioned and angled so that a small portion of light incident thereon when a trailing vehicle approaches with its headlights in high beam mode will be reflected backwardly. The reflector characteristics are chosen to provide a clear signal without blinding, distracting or annoying the offending driver. In one embodiment of this invention, the reflective surface comprises three mutually orthogonal plane rectangular faces coated with or made from a reflective material. This configuration is simple and inexpensive to construct and serves to reflect light back in substantially the same direction as the source.

The novel features of this invention sought to be patented are set forth with particularity in the appended claims. The invention, together with further objects and advantages thereof may be understood from a reading of the following specification and appended claims in view of the accompanying drawings, in which:

BRIEF DESCRIPTION OF DRAWINGS

FIG. 2 is a side elevation view of the vehicles and device of FIG. 1 showing the vehicles in closer proximity and trailing vehicle having its high beams on.

DETAILED DESCRIPTION OF INVENTION

Figure 1:
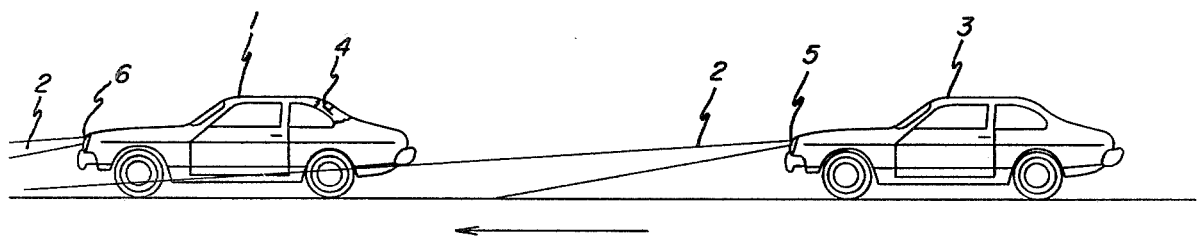
FIG. 1 is a side elevation view showing leading and trailing vehicles with a device in accordance with this invention mounted on the rear of the leading vehicle and with the trailing vehicle being operated with its headlights in low beam.

The operation of this invention can be described very simply. As shown in FIG. 1 two vehicles are traveling to the left. Vehicle 1 is the lead vehicle and vehicle 3 is the trailing vehicle. These vehicles have headlights 6 and 5, respectively. As shown in this figure both vehicles are operating with their headlights in low beam mode. The upper reaches of this low beam are typefied by the ray 2. A signaling device 4 in accordance with this invention is shown mounted on the rear of vehicle 1. Signaling device 4 includes at leat one reflective surface. The preferred embodiment of this invention has this reflecting surface mounted on the rear window of the vehicle. Signaling device 4 is not illuminated by the upper reaches of beam 2 emanating from head lamp 5 operated in low beam mode.

Figure 2:
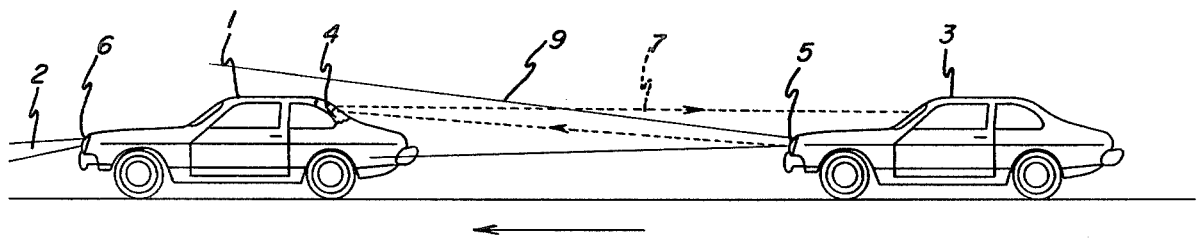

FIG. 2 is similar to FIG. 1 except that in FIG. 2 the trailing vehicle 3 is shown operating with its headlights in high beam mode. In addition, this figure also shows the trailing vehicle 3 closer to the lead vehicle 1 than in the first figure. However, the direction of travel is still to the left. Ray 9 in FIG. 2 suggests the upper reaches of the high beam. Signaling devices may be thus seem to be illuminated by energy from head lamp 5 when it is operating in high beam mode. Also shown in FIG. 2 is a typical ray 7 emanating from the headlight 5 of the trailing vehicle 3 and incident upon signaling device 4 and reflected therefrom. Thus, when a trailing vehicle has its high beams on, signaling device 4 is illuminated by the head lamps of the trailing vehicle and a portion of the light incident thereon is reflected backwardly to be observed by the operator of the trailing vehicle as a reminder to lower his beams to avoid annoyance and potential hazard to the operator of the lead vehicle. Obviously, when the trailing vehicle is using its low beams, no indication is given by signaling device 4.

The signaling device 4 comprises at least one reflective surface and mounting means and is mounted on the lead vehicle so as to reflect a portion of the light that is incident upon the device 4 when the trailing vehicle 3 is operating with its headlights 5 in high beam mode. It is mounted at such a height and such a angle so as only to reflect a significant portion of light when the trailing vehicle 3 is following too closely to the lead vehicle 1 with its high beam headlights on. The preferred mounting position for signaling device 4 is on the interior surface of the rear window of the vehicle as close to the top edge thereof as possible. This has been found to provide maximum contrast between the high beam and low beam indication, and also provides minimal interference with rear vision for the operator of the vehicle equipped with the device. If the trailing vehicle 3 has its low beam headlights on, the mounting angle is such that no substantial reflection occurs. In the preferred embodiment of this invention the effect of the reflection of high beam energy is such as to appear to the driver of the trailing vehicle 3 that a small bulb has been lit in the rear or rear window of the lead vehicle 1 when the trailing vehicle is driving too closely to the lead vehicle 1 with its high beam lights on.

The preferred mounting angle is a function of the configuration of the reflecting surface or surfaces which comprise signaling device 4. The desired mounting configuration is one in which the optic axis of the reflective elements of signaling device 4 is parallel to the direction of travel of the vehicle upon which it is mounted. Thus, in an embodiment in which the reflecting surface is a surface of revolution, for example, paraboloid, the desired angle may be provided by cutting the open end of the reflective surface at an angle complementary to the angle of the rear window of the vehicle to which it is to be attached, and providing a mounting flange normal to the edge of the reflective surface. When a corner reflector, such as that more particularly described hereinafter, is employed, mounting on a rear window may be very simply provided by providing two of the reflective surfaces of the corner reflector with orthogonal mounting tabs. It has been found through experimentation that highly satisfactory results are obtained from devises in accordance with this invention when the optic axis of the reflective elements of the device are within 15° depression and 30° elevation from horizontal. Since the rear windows of virtually all automobiles currently in use are mounted at angles within 15° of a 45° angle from vertical, mounting means as described immediately hereinabove provide adequate performance when applied generally to current vehicles. In case of vehicles such as station wagons, in which the rear window is not within 15° of a 45° angle the configuration of the mounting means with respect to the reflecting surfaces must be modified accordingly.

Alternatively, though not preferably, a signaling device in accordance with this invention might be mounted in another location, such as on the rear deck of an automobile. This is not preferred since, as hereinabove stated, maximum contrast is obtainable by mounting the signaling device of this invention as high as possible on the vehicle. If, however, it is desired to mount a signaling device in accordance with this invention in a location removed from the window, the reflective elements of the signaling device may be attached to one end of a post having a platform structure at the other end for mounting on, for example, the rear deck of a vehicle. In this case, obtaining the desired horizontal orientation of the optic axis is trivial since rear decks of automobiles are almost invariably horizontal. Other equivalent mounting configurations such as will occur to those skilled in the art are also within the scope of this invention.

Figure 3:
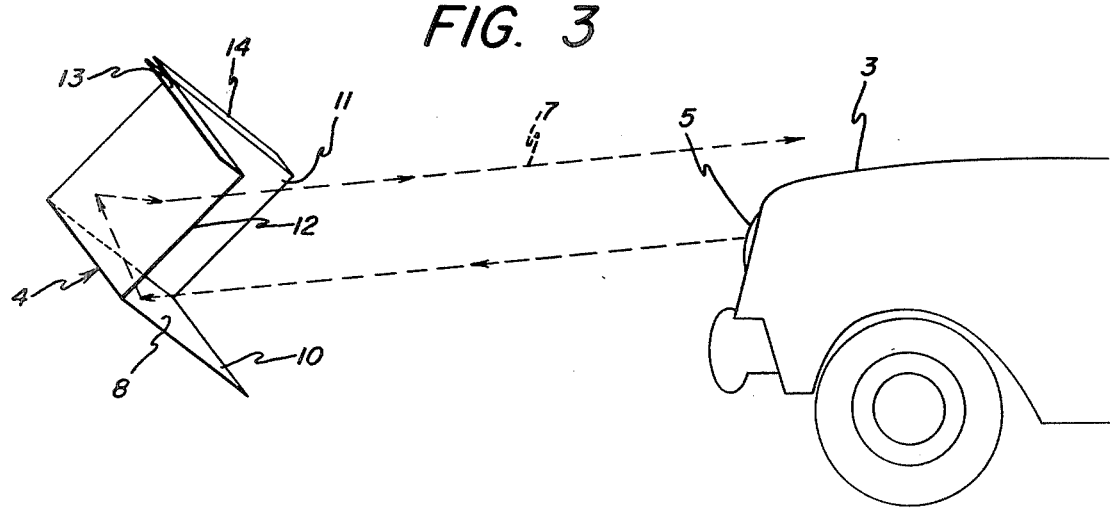
FIG. 3 is a diagram of one embodiment of this invention showing a typical light ray path for illumination of and reflection from the embodiment.

FIG. 3 shows a preferred embodiment of the signaling device of this invention in which the configuration of the reflecting element is that of a well known corner retro-reflector. This embodiment is preferred both because it has been found to provide superior performance, and because it is relatively simple and inexpensive to manufacture. The reflecting element comprises three mutually orthogonal planar surfaces 10, 11, and 12. These surfaces may be constructed of any suitable rigid material such as wood, plastic, metal, or cardboard. If constructed separately, they may be interconnected into the corner reflector configuration by any means known in the art, such as by gluing, but it is preferred to form the corner reflector as a unitary structure by injection molding of plastic. If desired, the corner reflector may be constructed of a material which is, in itself, reflective, such as, for example, of polished metal surfaces. Alternatively, and preferably, for reasons of cost, the molded plastic structural element described hereinabove has applied to the interior surfaces thereof a reflective substance such as metal foil, or reflective paint, or equivalent.

Surfaces 10 and 12 of the corner reflector shown in FIG. 3 have tabs 13 and 14 at the free edges thereof and configured orthogonally to the plane of the surfaces. In the injection molded embodiment described, it is convenient to have tabs 13 and 14 molded as a unit with the corner reflector, but this invention is not so limited as it is obvious that such tabs could be attached by any means known in the art. Tabs 13 and 14 preferably have an adhesive surface whereby the device of this invention may be attached to the rear window of a vehicle as heretofore described.

It has been found experimentally that the best results are obtained from a signaling device in accordance with this invention when the reflective elements are less than perfect mirror surfaces. Accordingly, in the preferred embodiment of this invention a small degree of optical scattering is intentionally introduced into the optical system. In the case of the corner reflector embodiment described, this may be accomplished by lightly scratching the reflective surfaces, or by intentionally allowing a small degree of buckling in, for example, metal foil reflecting elements applied to the mutually orthogonal plastic structural members of the reflective element. In the case of a reflective element configured as a parabolic surface of revolution, the desired small degree of scattering may be obtained by a light scratching of the reflective surface, or by the mounting, along the optic axis of the reflective device, of a small plastic sphere or equivalent scatterer. Other means of introducing a small degree of scattering into the optical system will occur to those skilled in the art, and are within the scope of this invention.

While this invention has been described with reference to particular embodiments and examples, other modifications and variations will occur to those skilled in the art, in view of the above teachings. Accordingly, it should be understood that within the scope of the appended claims, the invention may be practiced otherwise than is specifically described.

The invention claimed is:

1. Signaling apparatus for automotive vehicles comprising:
   a reflective surface configured to concentratingly reflect light incident thereon;
   scattering means for dispersing a portion of light energy concentratingly reflected by said reflective surface; and means for attaching said reflective surface to said vehicle at a location at which a first quantity of light energy is incident upon said reflective surface when a second vehicle traveling behind said vehicle is operated with high-beam headlamps illuminated, and a second, substantially smaller quantity of light energy is incident upon said reflective surface at all other times.

2. Signaling apparatus as claimed in claim 1 wherein said reflective surface more particularly comprises three mutually orthogonal planar reflecting surfaces forming a junction between each pair of surfaces.

3. The apparatus of claim 2 further including a support structure comprising three mutually orthogonal rigid plane members, each said plane member having four edges and two parallel opposed faces, each said plane member being joined to another said plane member along two of said edges to form a structure defining an interior portion and an exterior portion, said planar reflecting surfaces being applied to said interior portion.

4. The apparatus of claim 3 wherein said means for attaching comprises at least one flange member attached to one of said edges of said rigid plane members.

5. The apparatus of claim 4 including additionally a quantity of adhesive material disposed on said flange member.

6. Apparatus as claimed in claim 2 wherein said vehicle has a rear window member and said means for attaching comprises means for attaching said reflective surface to a vehicle interior surface of said rear window member to form in combination a generally 'Z' shaped structure having three arms, one of said arms being formed by said window member, one of said arms being formed by a junction of first and second of said mutually orthogonal surfaces, and one of said arms being formed by the third of said mutually orthogonal surfaces.

7. The apparatus of claim 6 wherein said reflective surface has an optic axis within the two of said arms of said 'Z' shaped structure formed by said junction and said third surface along a line forming an angle of 54.73 degrees with each junction between said mutually orthogonal surfaces, and said 'Z' shaped structure is oriented to maintain said optic axis at an angle within the range of 15° of depression and 30° of elevation to the course of said vehicle.

8. Apparatus as claimed in claim 7 including additionally scattering means for dispersing a portion of light energy concentratingly reflected by said reflective surface.

9. The apparatus of claim 8 wherein said scattering means comprise irregularities in said reflective surface.

10. Signaling apparatus as claimed in claim 1 wherein said reflective surface comprises a surface of revolution.

11. The apparatus of claim 1 wherein said scattering means comprise irregularities in said reflective surface.

12. The apparatus of claim 1 wherein said scattering means comprises a translucent body disposed along an optic axis of said reflective surface.

* * * * *